US011823494B2

(12) United States Patent
Hu et al.

(10) Patent No.: US 11,823,494 B2
(45) Date of Patent: Nov. 21, 2023

(54) HUMAN BEHAVIOR RECOGNITION METHOD, DEVICE, AND STORAGE MEDIUM

(71) Applicant: Beijing Baidu Netcom Science Technology Co., Ltd., Beijing (CN)

(72) Inventors: Tao Hu, Beijing (CN); Xiangbo Su, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 180 days.

(21) Appl. No.: 17/494,724

(22) Filed: Oct. 5, 2021

(65) Prior Publication Data
US 2022/0027606 A1  Jan. 27, 2022

(30) Foreign Application Priority Data

Jan. 25, 2021  (CN) .......................... 202110099947.2

(51) Int. Cl.
*G06V 40/20* (2022.01)
*G06V 20/52* (2022.01)
(Continued)

(52) U.S. Cl.
CPC .............. *G06V 40/20* (2022.01); *G06V 10/40* (2022.01); *G06V 10/751* (2022.01); *G06V 20/52* (2022.01)

(58) Field of Classification Search
CPC ...... G06V 40/20; G06V 10/40; G06V 10/751; G06V 20/52; G06N 3/04; G06N 3/084; G06F 18/24
See application file for complete search history.

(56) References Cited

U.S. PATENT DOCUMENTS

2019/0068895 A1*  2/2019  Hutz ................. G06F 18/24143
2019/0286892 A1*  9/2019  Li ............................. G06T 7/70
(Continued)

FOREIGN PATENT DOCUMENTS

CN       110135246 A      8/2019
CN       110348335 A      10/2019
(Continued)

OTHER PUBLICATIONS

European Patent Office; European Extended Search Report; European Application No. 21200368.5; dated Mar. 28, 2022; 11 pages.
(Continued)

*Primary Examiner* — Aaron W Carter
(74) *Attorney, Agent, or Firm* — Faegre Drinker Biddle Reath LLP

(57) ABSTRACT

A human behavior recognition method, a device, and a storage medium are provided, which are related to the field of artificial intelligence, specifically to computer vision and deep learning technologies, and applicable to smart city scenarios. The method includes: obtaining attribute information of a target object and N pieces of candidate behavior-related information of a target human from a target image, wherein N is an integer greater than or equal to 1; determining target behavior-related information based on comparison results between the N pieces of candidate behavior-related information and the attribute information of the target object; and determining a behavior recognition result of the target human based on the target behavior-related information.

16 Claims, 7 Drawing Sheets

(51) Int. Cl.
  *G06V 10/40* (2022.01)
  *G06V 10/75* (2022.01)

(56) References Cited

U.S. PATENT DOCUMENTS

| | | | |
|---|---|---|---|
| 2020/0242345 A1* | 7/2020 | Huang | G06V 10/44 |
| 2020/0242402 A1* | 7/2020 | Jung | G06F 18/00 |
| 2020/0364471 A1* | 11/2020 | Park | G06N 20/00 |
| 2021/0049390 A1* | 2/2021 | Wu | G06V 40/10 |
| 2022/0027606 A1* | 1/2022 | Hu | G06V 10/40 |
| 2022/0172518 A1* | 6/2022 | Tang | G06V 40/40 |
| 2022/0292170 A1* | 9/2022 | Khadloya | G06F 21/32 |
| 2022/0340787 A1* | 10/2022 | Gu | C09J 5/00 |
| 2023/0036402 A1* | 2/2023 | Wang | G06V 10/422 |
| 2023/0051232 A1* | 2/2023 | Zhou | G06V 40/20 |
| 2023/0127086 A1* | 4/2023 | Wakai | G06T 7/20 |
| | | | 382/181 |

FOREIGN PATENT DOCUMENTS

| | | |
|---|---|---|
| CN | 110363220 A | 10/2019 |
| CN | 110674712 A | 1/2020 |
| CN | 111079536 A | 4/2020 |
| CN | 111753721 A | 10/2020 |
| CN | 111931701 A | 11/2020 |

OTHER PUBLICATIONS

Zhou, Penghao et al.; Relation Parsing Neural Network for Human-Object Interaction Detection; 2019 IEEE/CVF International Conference on Computer Vision (ICCV); Oct. 27, 2019.

Yao, Bangpeng et al.; Modeling Mutual Context of Object and Human Pose in Human-Object Interaction Activities; 2010 IEEE Conference on Computer Vision and Pattern Recognition (CVPR); Jun. 18, 2020.

Chinese Patent Office; Chinese Office Action; Chinese Application No. 202110099947.2; dated Jun. 14, 2023; 9 pages.

* cited by examiner

```
                                            ┌─ S101
┌─────────────────────────────────────────────┴──┐
│ obtaining attribute information of a target object and N pieces │
│ of candidate behavior-related information of a target human │
│ from a target image, wherein N is an integer greater than or │
│                      equal to 1                 │
└─────────────────────────┬────────────────────┘
                          │            ┌─ S102
┌─────────────────────────┴───────────────┴──────┐
│ determining target behavior-related information based on │
│   comparison results between the N pieces of candidate │
│ behavior-related information and the attribute information of │
│                 the target object               │
└─────────────────────────┬──────────────────────┘
                          │            ┌─ S103
┌─────────────────────────┴───────────────┴──────┐
│ determining a behavior recognition result of the target human │
│     based on the target behavior-related information    │
└────────────────────────────────────────────────┘
```

FIG. 1

HUMAN BEHAVIOR RECOGNITION METHOD, DEVICE, AND STORAGE MEDIUM

CROSS-REFERENCE TO RELATED APPLICATIONS

This application claims priority to Chinese patent application, No. 202110099947.2, entitled "Human Behavior Recognition Method, Apparatus, Device, And Storage Medium", filed with the Chinese Patent Office on Jan. 25, 2021, which is hereby incorporated by reference in its entirety.

TECHNICAL FIELD

The present disclosure relates to the field of artificial intelligence, specifically to the computer vision and deep learning technologies.

BACKGROUND

With the development and application of artificial intelligence-related technologies, more and more fields show a strong demand for technologies of intelligence and automation, and the monitoring and security field is one of them.

In the field of computer vision, human behavior analysis and recognition are widely used, for example, monitoring whether employees play on the phone, make a call, read newspapers, and the like in the office; and monitoring whether workers smoke, do not wear masks, and the like in industrial scenes. In this way, inappropriate behaviors can be warned or recorded in time to help managers better manage the team.

SUMMARY

The present disclosure provides a human behavior recognition method, apparatus, device, and storage medium.

A first aspect of the present disclosure provides a human behavior recognition method, including:
  obtaining attribute information of a target object and N pieces of candidate behavior-related information of a target human from a target image, wherein N is an integer greater than or equal to 1;
  determining target behavior-related information based on comparison results between the N pieces of candidate behavior-related information and the attribute information of the target object; and
  determining a behavior recognition result of the target human based on the target behavior-related information.

A second aspect of the present disclosure provides a human behavior recognition apparatus, including:
  an information obtaining module, configured to obtain attribute information of a target object and N pieces of candidate behavior-related information of a target human from a target image, wherein N is an integer greater than or equal to 1;
  a target information determining module, configured to determine target behavior-related information based on comparison results between the N pieces of candidate behavior-related information and the attribute information of the target object; and
  a behavior determining module, configured to determine a behavior recognition result of the target human based on the target behavior-related information.

A third aspect of the present disclosure provides an electronic device, including:
  at least one processor; and
  a memory communicatively connected to the at least one processor, wherein
  the memory stores instructions executable by the at least one processor, and the instructions are executed by the at least one processor to enable the at least one processor to perform the method according to any embodiment of the present disclosure.

A fourth aspect of the present disclosure provides a non-transitory computer readable storage medium storing computer instructions, wherein the computer instructions are executed by a computer to enable the computer to perform the method according to any embodiment of the present disclosure.

A fifth aspect of the present disclosure provides a computer program product, including a computer program, wherein the computer program is executed by the processor to enable the processor to perform the method according to any embodiment of the present disclosure.

It should be understood that the content described in this section is not intended to identify key or important features of the embodiments of the present disclosure, nor to limit the scope of the present disclosure. Other features of the present disclosure will become easy to understand through the following description.

BRIEF DESCRIPTION OF DRAWINGS

The accompanying drawings are used to help better understand the solution, and do not constitute a limitation to the present disclosure, wherein:
FIG. 1 is a schematic diagram of a human behavior recognition method according to an embodiment of the present disclosure.

DETAILED DESCRIPTION OF EMBODIMENTS

Figure 2:
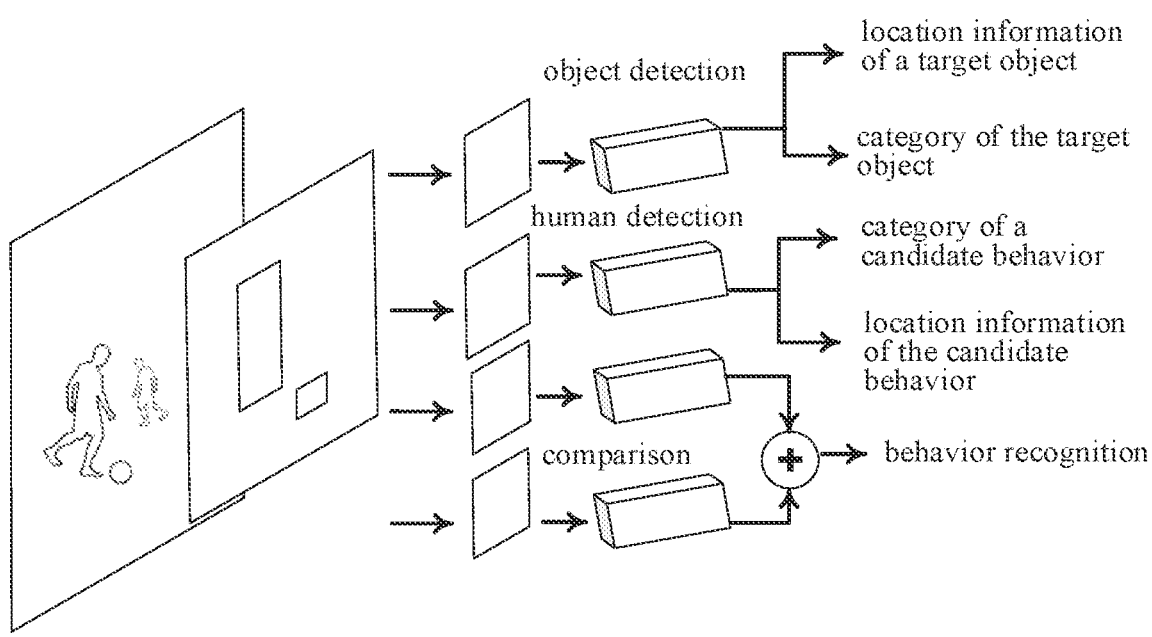
FIG. 2 is a schematic diagram of the application of a human behavior recognition method according to an embodiment of the present disclosure.

The following describes exemplary embodiments of the present disclosure with reference to the accompanying drawings, which include various details of the embodiments of the present disclosure to facilitate understanding, and they should be regarded as merely exemplary. Therefore, a person having ordinary skill in the art should appreciate that various changes and modifications to the embodiments described herein can be made without deviating from the scope and spirit of the present disclosure. Similarly, for clarity and conciseness, descriptions of well-known functions and structures are omitted in the following description.

In related technologies, when human behaviors are analyzed, feature extraction is performed on a human image by using a convolutional neural network, and then feature attributes are classified by using a series of fully-connected layers. The classification method is a standard, supervised, end-to-end learning method, which requires label data to calculate loss and perform back propagation to update weights in the network, to achieve the effect of learning.

A classification model corresponding to the classification method is a standard classification model. After the human location is determined from the image, the image of a domain where the human is located is input into the classification model, and the classification model outputs a human behavior and a score. Such classification model has low accuracy and misrecognition, which degrades user experience. Moreover, such classification model has domain gap problem. In a case that an input image is not similar to a training sample image, the effect of the classification model is significantly reduced, and the model is not robust. Moreover, such classification model is difficult to adjust. In a case that there is a classification error, it can only rely on increasing training data to adjust the effect of the model, which is not suitable for commercial scenarios.

FIG. 1 is a schematic diagram of a human behavior recognition method according to an embodiment of the present disclosure. As shown in FIG. 1, the human behavior recognition method may include:

Step S101: obtaining attribute information of a target object and N pieces of candidate behavior-related information of a target human from a target image, wherein N is an integer greater than or equal to 1;

Step S102: determining target behavior-related information based on comparison results between the N pieces of candidate behavior-related information and the attribute information of the target object; and Step S103: determining a behavior recognition result of the target human based on the target behavior-related information.

In human behavior recognition of related technologies, after obtaining a possible behavior of the human through analysis, the possible behavior is directly determined as a human behavior recognition result.

According to the human behavior recognition method of the embodiments of the present disclosure, after obtaining the N pieces of candidate behavior-related information of the target human in analyzing and recognizing human behaviors, candidate behaviors corresponding to the candidate behavior-related informations are not directly determined as the behavior recognition result of the target human. Instead, the N pieces of candidate behavior-related information are compared with the attribute information of the target object, the target behavior-related information is determined based on the comparison results, and the behavior recognition result of the target human is determined based on the target behavior-related information.

In a case that a human has a certain behavior, there is usually an object associated with the behavior. According to the human behavior recognition method of the embodiments of the present disclosure, image information can be fully excavated, and related information in the target image can be fully utilized. After obtaining the N pieces of candidate behavior-related information, a category of a candidate behavior corresponding to the candidate behavior-related information is not directly determined as the human behavior recognition result. Instead, a target object in the target image that is associated with the human is used for comparison and verification of the candidate behavior, the target behavior-related information is determined based on the comparison result, and the behavior recognition result of the target human is determined based on the target behavior-related information. The human behavior recognition method according to the present disclosure can improve accuracy of the obtained target behavior-related information, improve precision and accuracy of human behavior recognition, and avoid misrecognition, thereby improving user satisfaction. The technical solutions of the embodiments of the present disclosure can be applied in a smart city scenario.

The target image may be an image collected by a user, or an image captured in an original video stream. The source of the target image is not specifically limited herein. The target image may include a human and an object located in a certain range around the human. The target image may be an image illustrating the interaction between a human and an object. The target image may include a human and an object, wherein the human and the object may have behavioral interactions. The target image may include one or more humans, and a human on which the human behavior recognition is to be performed may be the target human, and an object within a certain range of the target human or interacting with the target human may be the target object.

For example, the attribute information of the target object may include at least one of a category and location information of the target object. The location information of the target object may be location information of the target object in the target image.

N candidate behaviors of the target human may be obtained from the target image, and each candidate behavior has corresponding relevant information. A piece of candidate behavior-related information may include at least one of a category and location information of a candidate behavior.

In an implementation, the N pieces of candidate behavior-related information may be respectively corresponding to confidence scores of the candidate behaviors. The above determining target behavior-related information based on comparison results between the N pieces of candidate behavior-related information and the attribute information of the target object may include: determining a comparison sequence of the N pieces of candidate behavior-related information based on confidence scores respectively corresponding to the N pieces of candidate behavior-related information; selecting, based on the comparison sequence, a piece of candidate behavior to be compared-related information from the N pieces of candidate behavior-related information, for comparison with the attribute information of the target object; and taking the piece of candidate behavior to be compared-related information as the target behavior-related information in a case that a comparison result is that the piece of candidate behavior to be compared-related information matches the attribute information of the target object.

A confidence score of a candidate behavior may represent a probability that a category of the corresponding candidate behavior is the behavior recognition result. The higher the confidence score, the higher the credibility that the category of the candidate behavior is the behavior recognition result.

Therefore, determining the comparison sequence of the N pieces of candidate behavior-related information based on the confidence scores respectively corresponding to the N pieces of candidate behavior-related information may optimize a comparison process and improve the efficiency of recognizing human behaviors.

For example, the comparison sequence of the N pieces of candidate behavior-related information may be determined based on an order from highest to lowest of confidence scores of candidate behaviors in the N pieces of candidate behavior-related information. The higher the confidence score, the higher the credibility that the category of the candidate behavior is the behavior recognition result. In this case, prioritizing a candidate behavior with a higher confidence score may quickly determine the target behavior-related information, and then quickly determine the behavior recognition result of the target human, thereby improving the efficiency of behavior identification.

In the foregoing embodiment, the comparison sequence of the N pieces of candidate behavior-related information is determined based on confidence scores. It may be understood that the present disclosure is not limited to determining the comparison sequence based on the confidence scores. In other embodiments, other methods may be used to determine the comparison sequence. For example, the comparison sequence may be determined based on pieces of location information of the candidate behaviors. In actual implementation, the comparison sequence of the N pieces of candidate behavior-related information may be determined based on actual requirements.

In an implementation, the attribute information of the target object includes the category of the target object, and the candidate behavior-related information includes the category of the candidate behavior. The human behavior recognition method may further include: determining, in a case that a category of a candidate behavior to be compared included in a piece of candidate behavior to be compared-related information from the N pieces of candidate behavior-related information matches a category of the target object, a comparison result that the piece of candidate behavior to be compared-related information matches the attribute information of the target object.

The candidate behavior to be compared-related information is a group of information in the N pieces of candidate behavior-related information, and the category of a candidate behavior to be compared may be one candidate behavior of the N candidate behaviors.

The piece of candidate behavior to be compared-related information is selected from the N pieces of candidate behavior-related information, and the category of the candidate behavior included in the piece of candidate behavior to be compared-related information is compared with the category of the target object. In a case that the category of the candidate behavior to be compared matches the category of the target object, the comparison result is that the piece of candidate behavior to be compared-related information matches the attribute information of the target object.

The category of a candidate behavior to be compared matches the category of the target object, which may be that the category of the candidate behavior to be compared is corresponding to the category of the target object, for example, the category of the target object is "football", and the category of the candidate behavior to be compared is "kick". "Football" is corresponding to "kick", so the comparison result is that the category of the candidate behavior to be compared i.e. "kick", matches the category of the target object, i.e. "football". If the category of the target object is "schoolbag", and the category of the candidate behavior to be compared is "kick", "schoolbag" is not corresponding to "kick", so the comparison result is that the category of the candidate behavior to be compared doesn't match the category of the target object. If the category of the target object is "schoolbag", and the category of the candidate behavior to be compared is "walk", "schoolbag" is not corresponding to "walk", so the comparison result is that the category of the candidate behavior to be compared, i.e. "walk", doesn't match the category of the target object, i.e. "schoolbag".

In an implementation, the attribute information of the target object includes location information of the target object, and the candidate behavior-related information includes location information of the candidate behavior. The human behavior recognition method may further include: determining, in a case that a difference between location information of a candidate behavior to be compared included in a piece of candidate behavior to be compared-related information from the N pieces of candidate behavior-related information and location information of the target object is within a preset range, a comparison result that the piece of candidate behavior to be compared-related information matches the attribute information of the target object.

The location information of the target object may be location information of the target object in the target image, and the location information of the candidate behavior to be compared may be location information of the candidate behavior to be compared in the target image. In the case that the difference between the location information of the candidate behavior to be compared and the location information of the target object is within the preset range, it may be determined that the location information of the candidate behavior to be compared matches the location information of the target object. In a case that the difference between the location information of the candidate behavior to be compared and the location information of the target object is not within the preset range, it may be determined that the location information of the candidate behavior to be compared doesn't match the location information of the target object.

It may be understood that in a case that a human has a certain behavior, if there is an object interacting with the behavior, a difference between the location of the object and the location of the behavior will satisfy a reasonable range, which may be set as the preset range. In a case that the difference between the location of the object and the location of the behavior does not satisfy the reasonable range, the human does not interact with the object, and therefore, the human will not perform a behavior for interaction with the object. For example, the human has a behavior of "kick", but a difference between a location of a subject for performing the behavior of "kick", i.e. the leg, and the location of the object "football" is not within the reasonable range. Therefore, it is considered that the human is "walking" instead of "kicking".

For example, the N pieces of candidate behavior-related information may be respectively corresponding to a location difference preset range. In a case that location information of a candidate behavior included in the candidate behavior to be compared-related information is compared with the location information of the target object, the difference between the location information of the candidate behavior to be compared and the location information of the target object may be calculated, and the difference is compared with the preset range. If the difference is within the preset range, the comparison result is that the candidate behavior to be compared-related information matches the attribute information of the target object. If the difference is not within the preset range, the comparison result is that the candidate behavior to be compared-related information doesn't match the attribute information of the target object.

It may be understood that the N pieces of candidate behavior-related information may be respectively corresponding to a location difference preset range, and the preset range may be determined according to a category of a candidate behavior. For example, the preset range of the behavior "kick" may be determined to be X centimeters, or greater or smaller according to actual conditions, and the specific value of the preset range may be determined according to actual conditions. The preset range is not specifically limited in this embodiment.

For example, the preset range corresponding to the candidate behavior to be compared-related information is a range of A, the category of the candidate behavior in the candidate behavior to be compared-related information is "kick", the location information of the candidate behavior is corresponding to a first location in the target image, and the location information of the target object is corresponding to a second location in the target image. The first location is compared with the second location to calculate a difference between them. If the difference is within the range of A, the comparison result is that the candidate behavior to be compared-related information matches the attribute information of the target object. If the difference between the first location and the second location is not within the range of A, the comparison result is that the candidate behavior to be compared-related information doesn't match the attribute information of the target object.

In an implementation, the attribute information of the target object includes the category of the target object, and the candidate behavior-related information includes the category of the candidate behavior. The attribute information of the target object includes the location information of the target object, and the candidate behavior-related information includes the location information of the candidate behavior. The human behavior recognition method may further include: determining, in a case that a category of a candidate behavior to be compared included in a piece of candidate behavior to be compared-related information from the N pieces of candidate behavior-related information matches a category of the target object, and a difference between location information of the candidate behavior included in the piece of candidate behavior to be compared-related information from the N pieces of candidate behavior-related information and location information of the target object is within a preset range, a comparison result that the piece of candidate behavior to be compared-related information matches the attribute information of the target object.

The standard of double-determination for comparison result can further improve the accuracy of behavior recognition, and improve the accuracy of recognition results, thereby improving user satisfaction.

The category of the candidate behavior is matched with the category of the target object, and/or the location information of the candidate behavior is matched with the location information of the target object. Information such as the category of the candidate behavior, the category of the target object, the location information of the candidate behavior, and the location information of the target object may be all identified and obtained from the target image. This not only fully excavates the image information in the target image, such matching method is also more in line with interactive behavior habits of the human, facilitates obtaining the comparison result, and improves the practicability of the human behavior recognition method of the present disclosure.

For example, in the candidate behavior to be compared-related information, the category of the candidate behavior is "kick", the location of the candidate behavior is the human foot, the location information of the candidate behavior is the first location. The category of the target object is "football", and the location information of the target object is the second location. The category of the candidate behavior "kick" is corresponding to the category of the target object "football", so the comparison result is that the above two are matched. The difference between the first location and the second location is within the preset range, the comparison result is that the location information of the candidate behavior matches the location information of the target object, so it is determined that the candidate behavior to be compared-related information matches the attribute information of the target object.

For example, the N pieces of candidate behavior-related information may be compared with the attribute information of the target object through a multilayer perceptron to obtain the comparison result, and the target behavior-related information is determined based on the comparison result. For example, the candidate behavior-related information and the attribute information of the target object are input into the multilayer perceptron, and the multilayer perceptron analyzes them to obtain the comparison result of the candidate behavior-related information and the attribute information of the target object, and outputs the target behavior-related information according to the comparison result.

In an implementation, determining a behavior recognition result of the target human based on the target behavior-related information may include: taking a category of a target behavior in the target behavior-related information as the behavior recognition result of the target human.

It may be understood that the target behavior-related information may include multiple pieces of information, and a behavior corresponding to the target behavior-related information needs to be determined after determining the target behavior-related information. Therefore, the category of the target behavior in the target behavior-related information is used as the behavior recognition result of the target human, and thus the behavior recognition result of the human can be directly obtained. This avoids a user looking for the recognition result from the target behavior-related information.

It may be understood that there may be a case that all the comparison results may be mismatch in comparing the candidate behavior to be compared-related information from the N pieces of candidate behavior-related information with the attribute information of the target object.

In an implementation, determining target behavior-related information based on comparison results between the N pieces of candidate behavior-related information and the attribute information of the target object further includes: determining basic behavior-related information in the N pieces of candidate behavior-related information as the target behavior-related information, in a case that the comparison results indicate that all the N pieces of candidate behavior-related information do not match the attribute information of the target object.

It may be understood that human image information is input into a classification model, and the classification model may determine the N pieces of candidate behavior-related information and confidence scores of the pieces of candidate behavior-related information according to key features in the human image information. The basic behavior-related information may be candidate behavior-related information with a relatively low confidence score. The basic behavior-related information may be determined as the target candidate behavior-related information in a case that the comparison results indicate that all the N pieces of candidate behavior-related information do not match the attribute information of the target object.

In this way, the behavior recognition result may always be obtained, avoiding that the behavior recognition result cannot be obtained if the comparison results are all mismatch. Moreover, a behavior category included in the basic behavior-related information may be matched with the human. Determining the basic behavior as the behavior recognition result may avoid misrecognition, and will not affect user satisfaction.

In an implementation, obtaining N pieces of candidate behavior-related information of a target human from a target image may include: obtaining human image information of the target human from the target image; and inputting the human image information into a classification model, to obtain the N pieces of candidate behavior-related information of the target human output by the classification model, wherein a piece of candidate behavior-related information includes at least one of a category and location information of a candidate behavior.

The candidate behavior-related information is set to include at least one of the category and the location information of the candidate behavior. Both of these two kinds of information may reflect key information of the candidate behavior in the target image. Using such key information is helpful to determine the behavior recognition result of the target human and improve the accuracy of behavior recognition.

The human image may be a sub-image corresponding to a region in the target image where the target human is located, and the sub-image corresponding to the region where the target human is located may be captured from the target image as a human image of the target human.

The classification model may be one of Resnet18, MobileNet, and ShuffleNet. The human image may be preprocessed after the human image of the target human is captured from the target image. A preprocessing process may include: scaling the human image of the target human to 412×412, normalizing pixel values, subtracting a mean value (such as [0.485, 0.456, 0.406]), and dividing by a variance (such as [0.229, 0.224, 0.225]), to obtain preprocessed human image information. The preprocessed human image information is used as human image information input into the classification model.

It may be understood that the method for preprocessing the human image is not limited to the foregoing method, and other preprocessing methods may also be used, as long as the human image information input into the classification model matches the classification model, and is beneficial to the processing of the classification model.

The classification model may be trained by using both a category and a location of a behavior, and the trained classification model may output the category and the location information of the candidate behavior. The location information of the candidate behavior may be calculated according to the location information of the human image information in the target image and relative location information of the candidate behavior relative to the human. The location information of the candidate behavior may be location information of the candidate behavior in the target image.

In an implementation, the human behavior recognition method may further include: extracting an image feature of the target image; determining, based on the image feature, the target human, location information of the target human, and the attribute information of the target object from the target image; and capturing, based on the location information of the target human, the human image information of the target human corresponding to the location information of the target human from the target image.

The image feature of the target image is used to determine the target human, the location information of the target human, the category of the target object, and the location information of the target object from the target image, which is easy to implement and may improve the efficiency of behavior recognition.

For example, a first neural network model, such as one of DarkNet-53 and ResNet, may be used to extract the image feature of the target image. The target image may be preprocessed before the target image is input into the neural network model. A preprocessing process may include: scaling the target image to 412×412, normalizing pixel values, subtracting a mean value (such as [0.485, 0.456, 0.406]), and dividing by a variance (such as [0.229, 0.224, 0.225]), to obtain preprocessed target image information. The preprocessed target image information is input into the first neural network model for image feature extraction.

For example, a second neural network model, such as a YOLO head module, may be used to obtain the location information of the human and the location information of the object in the target image from the image feature.

It may be understood that the target image may include a plurality of humans and a plurality of objects, and the plurality of humans and objects may be obtained based on the image feature of the target image. Human behavior analysis is performed on a target human in analyzing human behaviors. For example, a plurality of humans and a plurality of objects are obtained based on the image feature of the target image, threshold processing may be performed on the plurality of humans, and non-maximum suppression processing may be performed on the humans, so that the target human may be determined from the plurality of humans to avoid getting a non-target human. Threshold processing may be performed on the plurality of objects, and non-maximum suppression processing may be performed on the plurality of objects, so that the target object may be determined from the plurality of objects to avoid getting a non-target object. In this way, the accuracy of the human behavior recognition may be further improved.

Location information of the target human may be determined from the target image based on the determined target human, and the human image information of the target human corresponding to the location information of the target human may be captured from the target image based on the location information of the target human.

FIG. 2 is a schematic diagram of application of a human behavior recognition method according to an embodiment of the present disclosure. With reference to FIG. 2, the following describes a process of performing human behavior recognition by using the human behavior recognition method in an embodiment of the present disclosure.

An image feature of a target image in FIG. 2 is extracted. Object detection and human detection are performed based on the image feature, and a target human (the human occupying a larger area in the image), location information of the target human, a category of a target object ("football"), and location information of the target object are determined from the target image. The category of the target object is "football".

Human image information of the target human is captured from the target image based on the location information of the target human. The human image information is input into a classification model, to obtain three pieces of candidate behavior-related information of the target human output by the classification model, namely, first candidate behavior-related information, second candidate behavior-related information, and third candidate behavior-related information. Each piece of candidate behavior-related information includes a category and location information of a candidate behavior.

The category of a candidate behavior in the first candidate behavior-related information is "kick", and the location information of the candidate behavior is first location information. The category of a candidate behavior in the second candidate behavior-related information is "run", and the location information of the candidate behavior is second location information. The category of a candidate behavior in the third candidate behavior-related information is "walk", and the location information of the candidate behavior is third location information.

Each piece of candidate behavior-related information is corresponding to a confidence score, and the comparison sequence is determined based on confidence scores as follows: the first candidate behavior-related information, the second candidate behavior-related information, and the third candidate behavior-related information.

Based on the comparison sequence, the first candidate behavior-related information is selected as candidate behavior to be compared-related information, and the first candidate behavior-related information is compared with the attribute information of the target object. The category "kick" of the candidate behavior in the first candidate behavior-related information may be compared with the category "football" of the target object, and the first location information in the first candidate behavior-related information may be compared with the location information of the target object. Through comparison, the comparison result is determined that the first candidate behavior-related information matches the attribute information of the target object, and the first candidate behavior-related information is determined as the target behavior-related information. The category "kick" of the target behavior in the target behavior-related information is used as the behavior recognition result of the target human.

The third candidate behavior-related information in the three pieces of candidate behavior-related information is basic behavior-related information. The third candidate behavior-related information (namely, the basic behavior-related information) is determined as the target behavior-related information in a case that the comparison results indicate that all the three pieces of candidate behavior-related information do not match the attribute information of the target object. The category "walk" of the target behavior in the target behavior-related information is used as the behavior recognition result of the target human.

Figure 3:
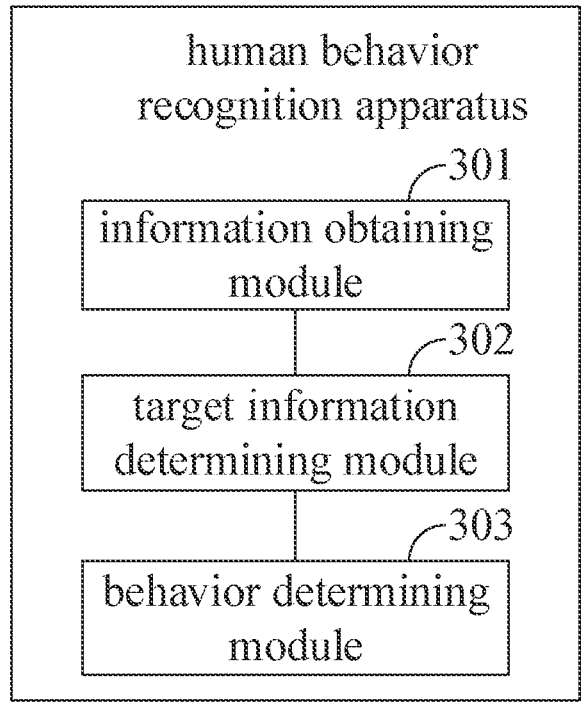
FIG. 3 is a structural block diagram of a human behavior recognition apparatus according to an embodiment of the present disclosure.

FIG. 3 is a structural block diagram of a human behavior recognition apparatus according to an embodiment of the present disclosure. In an implementation, as shown in FIG. 3, the human behavior recognition apparatus includes:

an information obtaining module 301, configured to obtain attribute information of a target object and N pieces of candidate behavior-related information of a target human from a target image, wherein N is an integer greater than or equal to 1;

a target information determining module 302, configured to determine target behavior-related information based on comparison results between the N pieces of candidate behavior-related information and the attribute information of the target object; and a behavior determining module 303, configured to determine a behavior recognition result of the target human based on the target behavior-related information.

Figure 4:
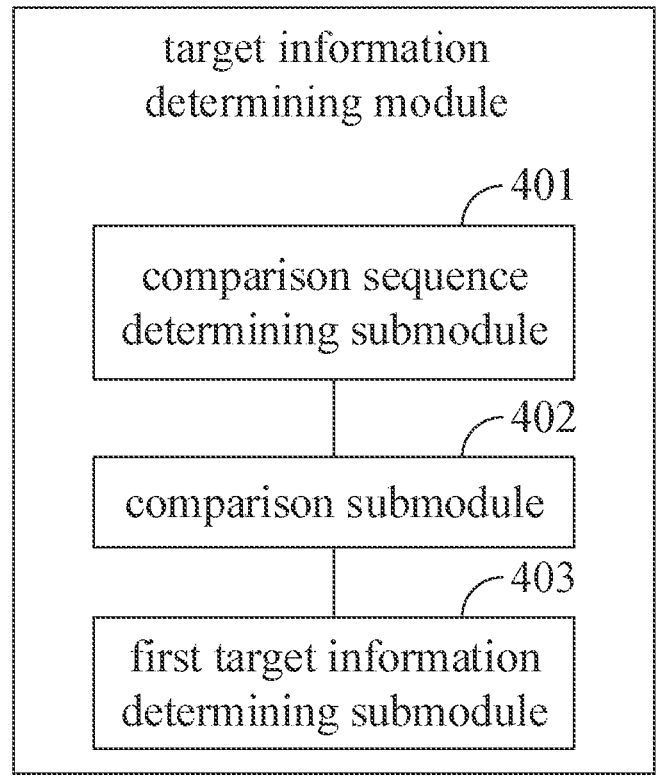
FIG. 4 is a structural block diagram of a target information determining module according to an embodiment of the present disclosure.

FIG. 4 is a structural block diagram of a target information determining module according to an embodiment of the present disclosure. In an implementation, as shown in FIG. 4, the target information determining module includes: a comparison sequence determining submodule 401, configured to determine a comparison sequence of the N pieces of candidate behavior-related information based on confidence scores respectively corresponding to the N pieces of candidate behavior-related information; a comparison submodule 402, configured to select, based on the comparison sequence, a piece of candidate behavior to be compared-related information from the N pieces of candidate behavior-related information for comparison with the attribute information of the target object; and a first target information determining submodule 403, configured to take the piece of candidate behavior to be compared-related information as the target behavior-related information in a case that a comparison result is that the piece of candidate behavior to be compared-related information matches the attribute information of the target object.

Figure 5:
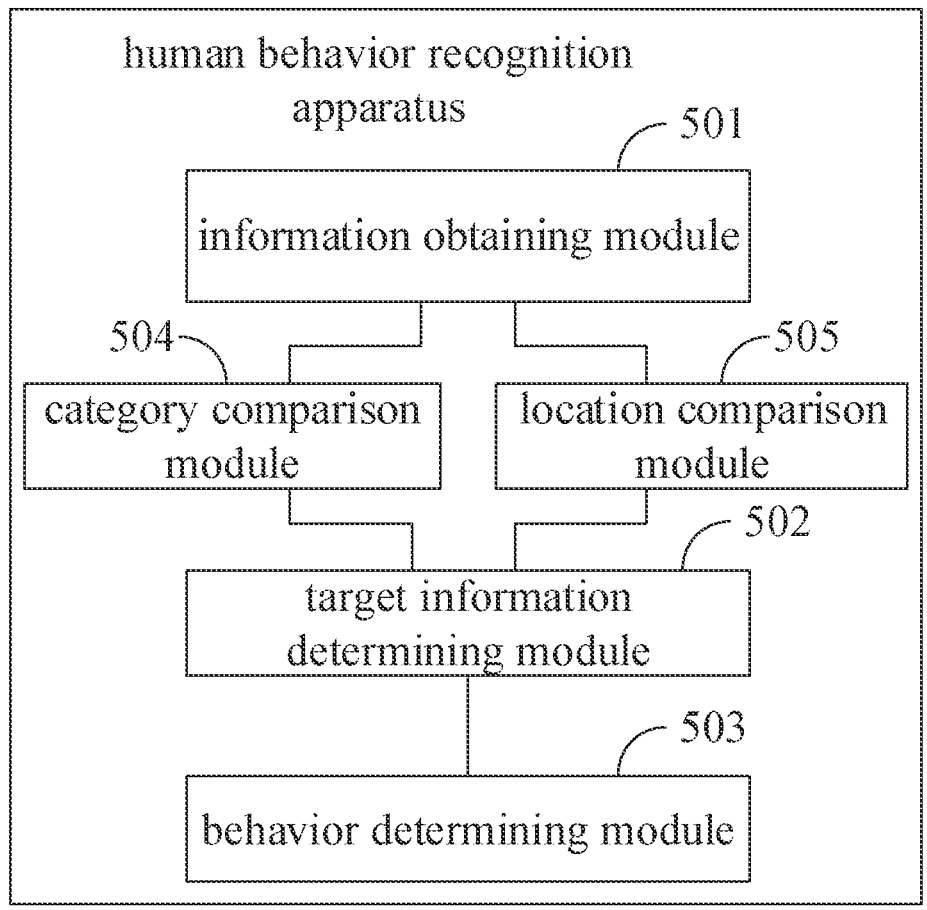
FIG. 5 is a structural block diagram of a human behavior recognition apparatus according to an embodiment of the present disclosure.

FIG. 5 is a structural block diagram of a human behavior recognition apparatus according to an embodiment of the present disclosure. In an implementation, as shown in FIG. 5, the apparatus may include an information obtaining module 501, a target information determining module 502, a behavior determining module 503, and at least one of the following: a category comparison module 504, configured to determine, in a case that a category of a candidate behavior to be compared included in a piece of candidate behavior to be compared-related information from the N pieces of candidate behavior-related information matches a category of the target object, a comparison result that the piece of candidate behavior to be compared-related information matches the attribute information of the target object; and a location comparison module 505, configured to determine, in a case that a difference between location information of a candidate behavior included in a piece of candidate behavior to be compared-related information from the N pieces of candidate behavior-related information and location information of the target object is within a preset range, a comparison result that the piece of candidate behavior to be compared-related information matches the attribute information of the target object.

For example, the information obtaining module 501, the target information determining module 502, and the behavior determining module 503 in FIG. 5 may be respectively identical or similar to the information obtaining module 301, the target information determining module 302, and the behavior determining module 303 in FIG. 3.

In an implementation, the behavior determining module is configured to take a category of a target behavior in the target behavior-related information as the behavior recognition result of the target human.

Figure 6:
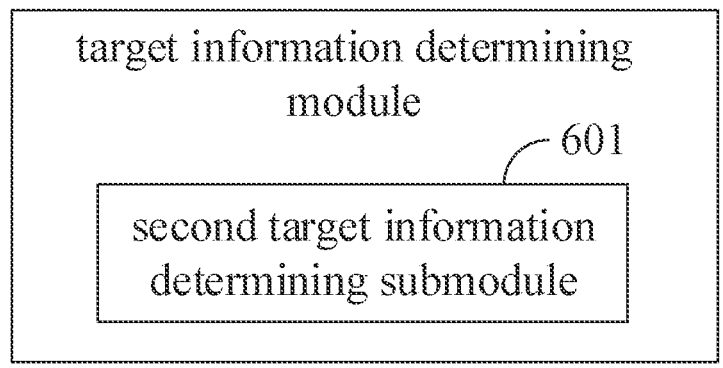
FIG. 6 is a structural block diagram of a target information determining module according to an embodiment of the present disclosure.

FIG. 6 is a structural block diagram of a target information determining module in an embodiment of the present disclosure. In an implementation, as shown in FIG. 6, the target information determining module includes: a second target information determining submodule 601, configured to determine basic behavior-related information in the N pieces of candidate behavior-related information as the target behavior-related information, in a case that the comparison results indicate that all the N pieces of candidate behavior-related information do not match the attribute information of the target object.

Figure 7:
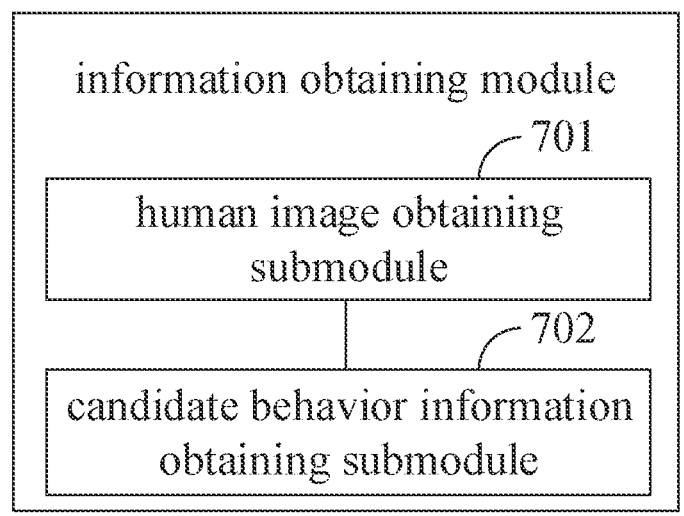
FIG. 7 is a structural block diagram of an information obtaining module according to an embodiment of the present disclosure.

FIG. 7 is a structural block diagram of an information obtaining module according to an embodiment of the present disclosure. In an implementation, as shown in FIG. 7, the information obtaining module includes: a human image obtaining submodule 701, configured to obtain human image information of the target human from the target image; and a candidate behavior information obtaining submodule 702, configured to input the human image information into a classification model, to obtain the N pieces of candidate behavior-related information of the target human output by the classification model, wherein a piece of candidate behavior-related information includes at least one of a category and location information of a candidate behavior.

Figure 8:
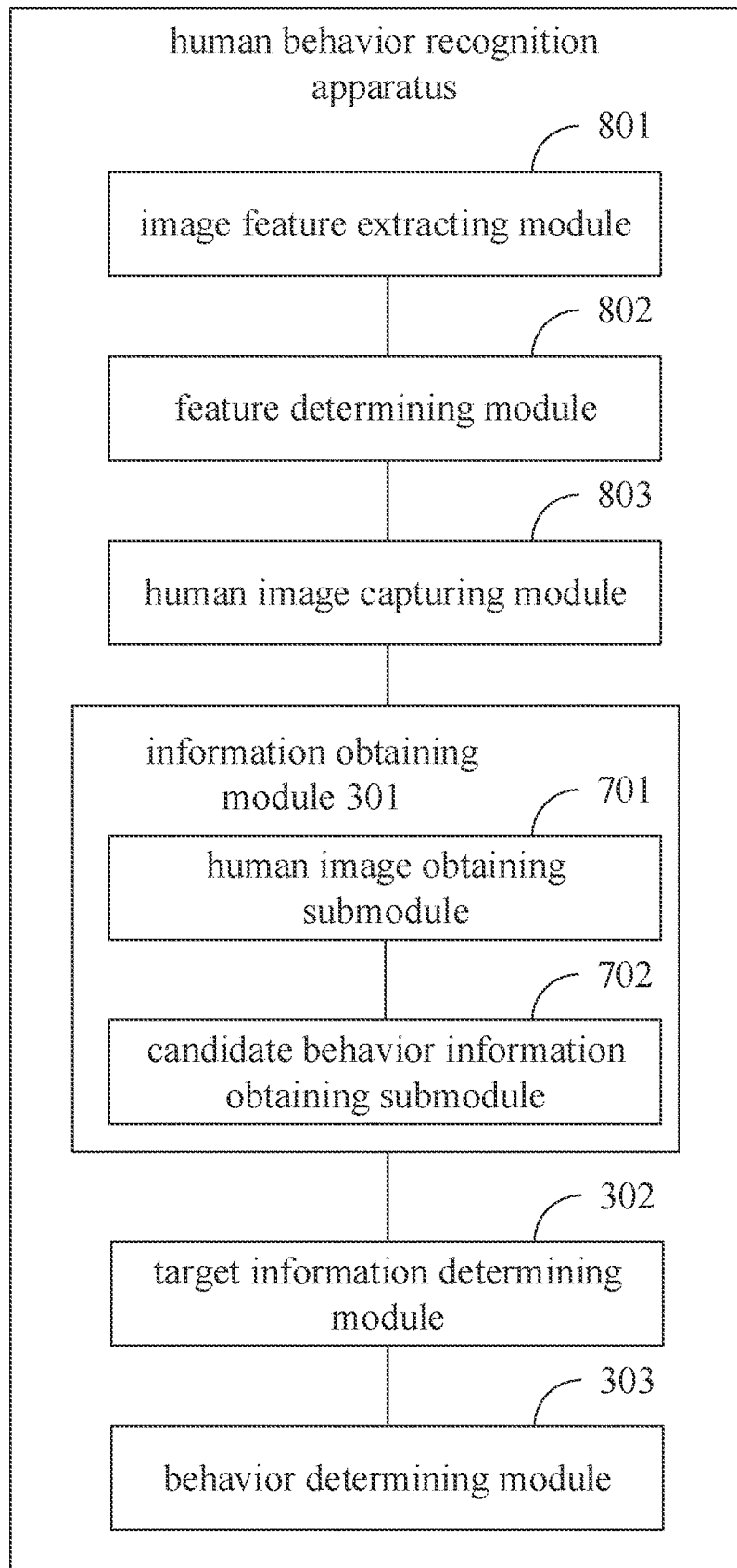
FIG. 8 is a structural block diagram of a human behavior recognition apparatus according to an embodiment of the present disclosure.

FIG. 8 is a structural block diagram of a human behavior recognition apparatus according to an embodiment of the present disclosure. In an implementation, as shown in FIG. 8, the apparatus further includes: an image feature extracting module 801, configured to extract an image feature of the target image; a feature determining module 802, configured to determine, based on the image feature, the target human, location information of the target human, and the attribute information of the target object from the target image; and a human image capturing module 803, configured to capture, based on the location information of the target human, the human image information of the target human corresponding to the location information of the target human from the target image.

According to the embodiments of the present disclosure, the present disclosure also provides an electronic device, a readable storage medium, and a computer program product.

Figure 9:
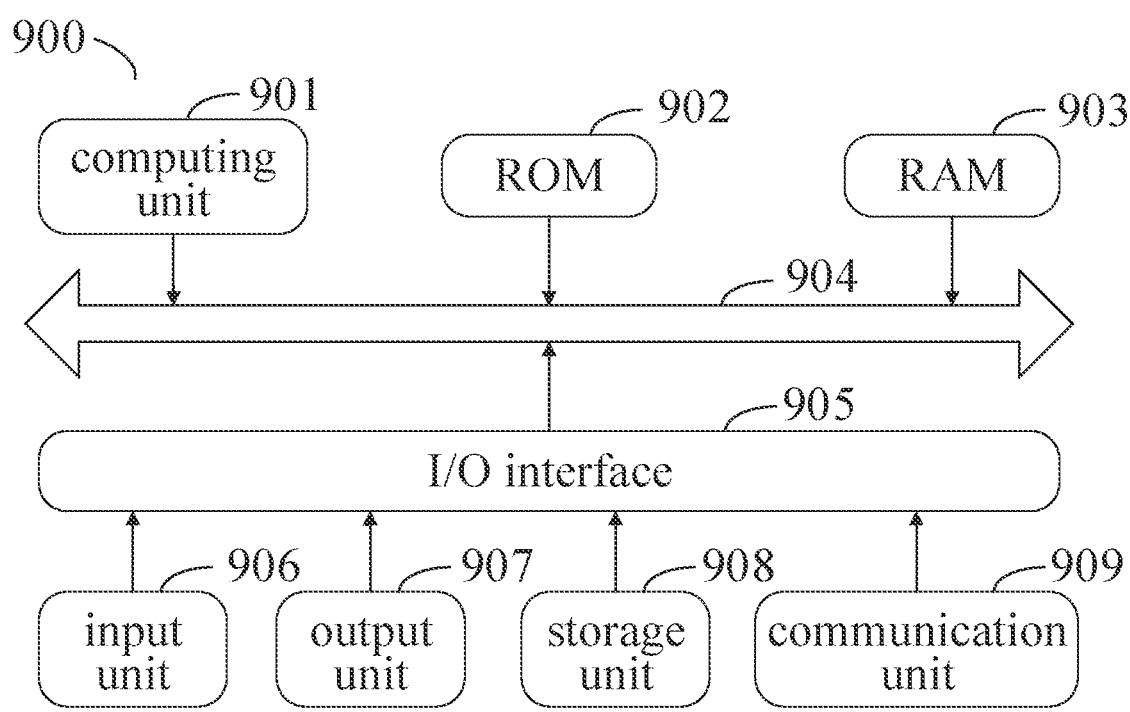
FIG. 9 is a block diagram of an electronic device for implementing a human behavior recognition method according to an embodiment of the present disclosure.

FIG. 9 is a schematic block diagram of an exemplary electronic device 900 that may be used to implement the embodiments of the present disclosure. The electronic device is intended to represent various forms of digital computers, such as a laptop, a desktop, a workbench, a personal digital assistant, a server, a blade server, a mainframe computer, and other suitable computers. The electronic device may also represent various forms of mobile devices, such as a personal digital processor, a cellular phone, a smart phone, a wearable device, and other similar computing devices. The components, their connections and relationships, and their functions shown in the present disclosure are merely examples, and will not limit the implementation described and/or required in the present disclosure.

As shown in FIG. 9, the device 900 includes a computing unit 901, which may perform various appropriate actions and processes according to a computer program stored in a read-only memory (ROM) 902 or a computer program loaded from a storage unit 908 into a random-access memory (RAM) 903. Various programs and data required for the operation of the device 900 may also be stored in the RAM 903. The computing unit 901, the ROM 902, and the RAM 903 are connected to each other through a bus 904. An input/output (I/O) interface 905 is also connected to the bus 904.

A plurality of components in the device 900 are connected to the I/O interface 905, including: an input unit 906, such as a keyboard and a mouse; an output unit 907, such as various types of displays and speakers; a storage unit 908, such as a magnetic disk and an optical disk; and a communication unit 909, such as a network card, a modem, and a wireless communication transceiver. The communication unit 909 allows the device 900 to exchange information/data with other devices through a computer network such as the Internet and/or various telecommunication networks.

The computing unit 901 may be various general-purpose and/or special-purpose processing components with processing and calculating capabilities. Some examples of the computing unit 901 include but not limited to central processing unit (CPU), graphics processing unit (GPU), various dedicated artificial intelligence (AI) computing chips, various computing units running machine learning model algorithms, digital signal processors (DSP), and any appropriate processors, controllers, microcontrollers, and the like. The computing unit 901 performs the various methods and processes described above, such as the human behavior recognition method. For example, in some embodiments, the human behavior recognition method may be implemented as a computer software program, which is physically included in a machine-readable medium, such as the storage unit 908. In some embodiments, part or all of the computer program may be loaded and/or installed on the device 900 via the ROM 902 and/or the communication unit 909. If the computer program is loaded into the RAM 903 and executed by the computing unit 901, one or more steps of the human behavior recognition method described above may be performed. Alternatively, in other embodiments, the computing unit 901 may be configured to perform the human behavior recognition method in any other appropriate manner (for example, with the help of firmware).

Various implementations of the systems and technologies described in the present disclosure may be implemented in a digital electronic circuit system, an integrated circuit system, a field programmable gate array (FPGA) an application specific integrated circuit (ASIC), an application-specific standard product (ASSP), a system-on-chip (SOC), a complex programmable logical device (CPLD), computer hardware, firmware, software, and/or their combination. These various implementations may include: being implemented in one or more computer programs, wherein the one or more computer programs may be executed and/or interpreted on a programmable system including at least one programmable processor, the programmable processor may be a dedicated or general-purpose programmable processor that may receive data and instructions from a storage system, at least one input apparatus, and at least one output apparatus, and transmit the data and instructions to the storage system, the at least one input apparatus, and the at least one output apparatus.

Program code used to implement the method of the present disclosure may be written in any combination of one or more programming languages. The program code may be provided for processors or controllers of the general-purpose computer, the special-purpose computer, or other programmable data processing apparatus, so that if the program code is executed by the processor or controller, functions/operations specified in the flowcharts and/or block diagrams will be implemented. The program code may be executed entirely or partially on a machine, partly executed on a machine and a remote machine, or entirely executed on a remote machine or a server as an independent software package.

In the context of the present disclosure, the machine-readable medium may be a tangible medium, which may include or store a program used by an instruction execution system, apparatus, or device or in combination with the instruction execution system, apparatus, or device. The machine-readable medium may be a machine-readable signal medium or a machine-readable storage medium. The machine-readable medium may include, but is not limited to an electronic, magnetic, optical, electromagnetic, infrared, or semiconductor system, apparatus, or device, or any appropriate combination of the above. A more specific example of the machine-readable storage medium may include an electrical connection based on one or more wires, a portable computer disk, a hard disk, a random-access memory (RAM), a read-only memory (ROM), an erasable programmable read-only memory (EPROM or flash memory), optical fiber, a portable compact disc read-only memory (CD-ROM), an optical storage device, a magnetic storage device, or any appropriate combination of the above.

To provide interaction with the user, the system and technique described herein may be implemented on a computer. The computer includes: a display apparatus for displaying information to the user (for example, a CRT (cathode ray tube) or LCD (liquid crystal display) monitor)); and a keyboard and a pointing apparatus (for example, a mouse or a trackball), through which the user may provide input for the computer. Other types of apparatuses may also be configured to provide interaction with the user; for example, feedback provided to the user may be any form of sensory feedback (for example, visual feedback, auditory feedback, or tactile feedback); and input from the user may be received in any form, including acoustic input, voice input, or tactile input.

The system and technique described herein may be implemented in a computing system that includes daemon components (for example, a data server), or a computing system that includes middleware components (for example, an application server), or a computing system that includes front-end components (for example, a user computer with a graphical user interface or web browser, through which the user may interact with an implementation of the system and technique described herein), or a computing system that includes any combination of such daemon components, middleware components, or front-end components. Components of the system may be connected to each other through any form or medium of digital data communication (for example, a communication network). Examples of the communication network include: local area network (LAN), wide area network (WAN), and the Internet.

The computer system may include a client and a server. The client and server are generally far away from each other and usually interact with each other through a communication network. A relationship between the client and the server is generated by running a computer program that has a client-server relationship on a corresponding computer.

It should be understood that the steps in the various processes described above may be reordered or omitted, or other steps may be added therein. For example, the steps described in the present disclosure may be performed in parallel or sequentially or may be performed in a different order, so long as the desired result of the technical solutions disclosed in the present disclosure can be achieved, and no limitation is made herein.

Above specific embodiments do not constitute a limitation on the protection scope of the present disclosure. It should be understood by those skilled in the art that various modifications, combinations, sub-combinations, and substitutions may be available according to design requirements and other factors. Any modifications, equivalent replacements and improvements made within the spirit and principle of the present disclosure shall be covered within the protection scope of the present disclosure.

The invention claimed is:

1. A human behavior recognition method, comprising:
   obtaining attribute information of a target object and N pieces of candidate behavior-related information of a target human from a target image, wherein N is an integer greater than or equal to 1;
   determining target behavior-related information based on comparison results between the N pieces of candidate behavior-related information and the attribute information of the target object; and
   determining a behavior recognition result of the target human based on the target behavior-related information,
   wherein determining the target behavior-related information based on the comparison results between the N pieces of candidate behavior-related information and the attribute information of the target object comprises:
   determining a comparison sequence of the N pieces of candidate behavior-related information based on confidence scores respectively corresponding to the N pieces of candidate behavior-related information;
   selecting, based on the comparison sequence, a piece of candidate behavior to be compared-related information from the N pieces of candidate behavior-related information, for comparison with the attribute information of the target object; and
   taking the piece of candidate behavior to be compared-related information as the target behavior-related information, in a case that a comparison result is that the piece of candidate behavior to be compared-related information matches the attribute information of the target object.

2. The method according to claim 1, further comprising at least one of the following:
   determining, in a case that a category of a candidate behavior to be compared comprised in a piece of candidate behavior to be compared-related information from the N pieces of candidate behavior-related information matches a category of the target object, a comparison result that the piece of candidate behavior to be compared-related information matches the attribute information of the target object; and
   determining, in a case that a difference between location information of a candidate behavior to be compared comprised in a piece of candidate behavior to be compared-related information from the N pieces of candidate behavior-related information and location information of the target object is within a preset range, a comparison result that the piece of candidate behavior to be compared-related information matches the attribute information of the target object.

3. The method according to claim 1, wherein determining the behavior recognition result of the target human based on the target behavior-related information comprises:
   taking a category of a target behavior in the target behavior-related information as the behavior recognition result of the target human.

4. The method according to claim 1, wherein determining the target behavior-related information based on the comparison results between the N pieces of candidate behavior-related information and the attribute information of the target object comprises:
   determining basic behavior-related information in the N pieces of candidate behavior-related information as the target behavior-related information, in a case that the comparison results indicate that all the N pieces of candidate behavior-related information do not match the attribute information of the target object.

5. The method according to claim 1, wherein obtaining the N pieces of candidate behavior-related information of the target human from the target image comprises:
   obtaining human image information of the target human from the target image; and
   inputting the human image information into a classification model, to obtain the N pieces of candidate behavior-related information of the target human output by the classification model, wherein
   a piece of candidate behavior-related information comprises at least one of a category and location information of a candidate behavior.

6. The method according to claim 5, further comprising:
   extracting an image feature of the target image;
   determining, based on the image feature, the target human, location information of the target human, and the attribute information of the target object from the target image; and
   capturing, based on the location information of the target human, the human image information of the target human corresponding to the location information of the target human from the target image.

7. An electronic device, comprising:
   at least one processor; and
   a memory communicatively connected to the at least one processor, wherein
   the memory stores instructions executable by the at least one processor, and the instructions are executed by the at least one processor to enable the at least one processor to:
   obtain attribute information of a target object and N pieces of candidate behavior-related information of a target human from a target image, wherein N is an integer greater than or equal to 1;
   determine target behavior-related information based on comparison results between the N pieces of candidate behavior-related information and the attribute information of the target object; and
   determine a behavior recognition result of the target human based on the target behavior-related information,
   wherein the instructions are executed by the at least one processor to enable the at least one processor to:
   determine a comparison sequence of the N pieces of candidate behavior-related information based on confidence scores respectively corresponding to the N pieces of candidate behavior-related information;
   select, based on the comparison sequence, a piece of candidate behavior to be compared-related information from the N pieces of candidate behavior-related information, for comparison with the attribute information of the target object; and
   take the piece of candidate behavior to be compared-related information as the target behavior-related information, in a case that a comparison result is that the piece of candidate behavior to be compared-related information matches the attribute information of the target object.

8. The electronic device according to claim 7, wherein the instructions are executed by the at least one processor to enable the at least one processor to:
   determine, in a case that a category of a candidate behavior to be compared comprised in a piece of candidate behavior to be compared-related information from the N pieces of candidate behavior-related information matches a category of the target object, a comparison result that the piece of candidate behavior to be compared-related information matches the attribute information of the target object; and
   determine, in a case that a difference between location information of a candidate behavior to be compared comprised in a piece of candidate behavior to be compared-related information from the N pieces of candidate behavior-related information and location information of the target object is within a preset range, a comparison result that the piece of candidate behavior to be compared-related information matches the attribute information of the target object.

9. The electronic device according to claim 7, wherein the instructions are executed by the at least one processor to enable the at least one processor to:
   take a category of a target behavior in the target behavior-related information as the behavior recognition result of the target human.

10. The electronic device according to claim 7, wherein the instructions are executed by the at least one processor to enable the at least one processor to:
    determine basic behavior-related information in the N pieces of candidate behavior-related information as the target behavior-related information, in a case that the comparison results indicate that all the N pieces of candidate behavior-related information do not match the attribute information of the target object.

11. The electronic device according to claim 7, wherein the instructions are executed by the at least one processor to enable the at least one processor to:
    obtain human image information of the target human from the target image; and
    input the human image information into a classification model, to obtain the N pieces of candidate behavior-related information of the target human output by the classification model, wherein
    a piece of candidate behavior-related information comprises at least one of a category and location information of a candidate behavior.

12. The electronic device according to claim 11, wherein the instructions are executed by the at least one processor to enable the at least one processor to:
    extract an image feature of the target image;
    determine, based on the image feature, the target human, location information of the target human, and the attribute information of the target object from the target image; and
    capture, based on the location information of the target human, the human image information of the target human corresponding to the location information of the target human from the target image.

13. A non-transitory computer readable storage medium storing computer instructions, wherein the computer instructions are executed by a computer to enable the computer to:
    obtain attribute information of a target object and N pieces of candidate behavior-related information of a target human from a target image, wherein N is an integer greater than or equal to 1;
    determine target behavior-related information based on comparison results between the N pieces of candidate behavior-related information and the attribute information of the target object; and
    determine a behavior recognition result of the target human based on the target behavior-related information, wherein the computer instructions are executed by the computer to enable the computer to:

determine a comparison sequence of the N pieces of candidate behavior-related information based on confidence scores respectively corresponding to the N pieces of candidate behavior-related information;

select, based on the comparison sequence, a piece of candidate behavior to be compared-related information from the N pieces of candidate behavior-related information, for comparison with the attribute information of the target object; and take the piece of candidate behavior to be compared-related information as the target behavior-related information, in a case that a comparison result is that the piece of candidate behavior to be compared-related information matches the attribute information of the target object.

14. The non-transitory computer-readable storage medium according to claim 13, wherein the computer instructions are executed by the computer to enable the computer to:

determine, in a case that a category of a candidate behavior to be compared comprised in a piece of candidate behavior to be compared-related information from the N pieces of candidate behavior-related information matches a category of the target object, a comparison result that the piece of candidate behavior to be compared-related information matches the attribute information of the target object; and determine, in a case that a difference between location information of a candidate behavior to be compared comprised in a piece of candidate behavior to be compared-related information from the N pieces of candidate behavior-related information and location information of the target object is within a preset range, a comparison result that the piece of candidate behavior to be compared-related information matches the attribute information of the target object.

15. The non-transitory computer-readable storage medium according to claim 13, wherein the computer instructions are executed by the computer to enable the computer to:

take a category of a target behavior in the target behavior-related information as the behavior recognition result of the target human.

16. The non-transitory computer-readable storage medium according to claim 13, wherein the computer instructions are executed by the computer to enable the computer to:

determine basic behavior-related information in the N pieces of candidate behavior-related information as the target behavior-related information, in a case that the comparison results indicate that all the N pieces of candidate behavior-related information do not match the attribute information of the target object.

* * * * *